UNITED STATES PATENT OFFICE.

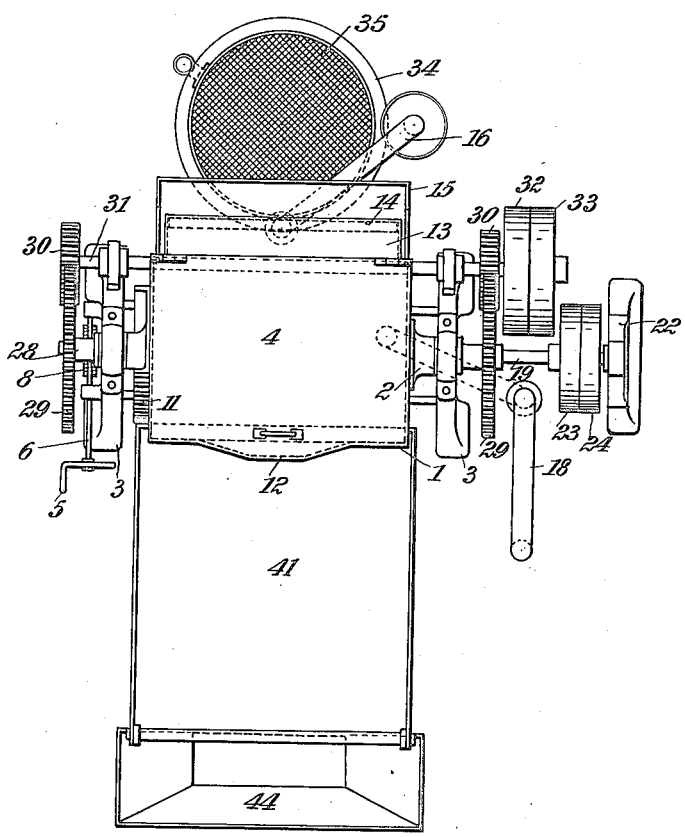

PAUL GROSS, OF CHARLOTTENBURG, GERMANY, ASSIGNOR TO VOLLBROT PATENT-VERWERTUNGS-GESELLSCHAFT, M. B. H., OF BERLIN, GERMANY, A FIRM.

PROCESS FOR THE MANUFACTURE OF WHOLE-GRAIN BREAD.

1,213,627.  Specification of Letters Patent.  Patented Jan. 23, 1917.

Application filed December 5, 1916. Serial No. 135,201.

*To all whom it may concern:*

Be it known that I, PAUL GROSS, a subject of the German Emperor, and resident of Charlottenburg, near Berlin, in the Kingdom of Prussia, German Empire, and whose post-office address is Reichsstrasse 105, Charlottenburg, have invented new and useful Improvements in the Process for the Manufacture of Whole-Grain Bread, of which the following is a full, clear, and exact specification.

This invention relates to a process for the manufacture of whole grain bread etc. Its object is to attain the best possible yield in products of this kind by removing as completely as possible the bran with its content of cellulose on the one hand and on the other hand to retain with the least possible loss those parts of the grain which are richest in albumin (layers of gluten). This is achieved by soaking the grain in water of about 60 to 65 centigrade, simultaneously scouring it by means of beaters so as to remove the bran and then flouring it. By soaking and beating at the comparatively high temperature aforesaid, the bran is separated from the grain while the layers of gluten remain intact. The grain which in this manner has been freed from the bran and is somewhat swelled can be made into a very fine pulp which after kneading it into dough and adding leaven can be baked after a short time.

The separated bran may be used for manufacturing cellulose or as fodder, etc., the starch that is contained in the excess soaking water can be recovered by placing the water in a settling tank where the starch contained in the water will deposit.

This process can not only be applied to the treatment of grain but also to the treatment of any other vegetables for any industrial or technical purposes. For example, vegetables treated according to my process may be used for manufacturing a substitute for coffee, marmalade, etc.

The apparatus with which this process is preferably to be performed is so constructed that the grain is treated up to its flouring, i. e. washed, soaked and freed from the bran in a single vessel and with a limited amount of power. For this purpose, a specially constructed stirrer and beater are arranged in a vessel that may be tilted to either side. In order to enable the usual roller mills having several superimposed sets of three rollers each to be employed for immediate disintegration of the moist grain, such roller mills are specially constructed according to this invention.

In the accompanying drawings, a preferred form of apparatus for carrying out the said process is illustrated.

Figure 1:
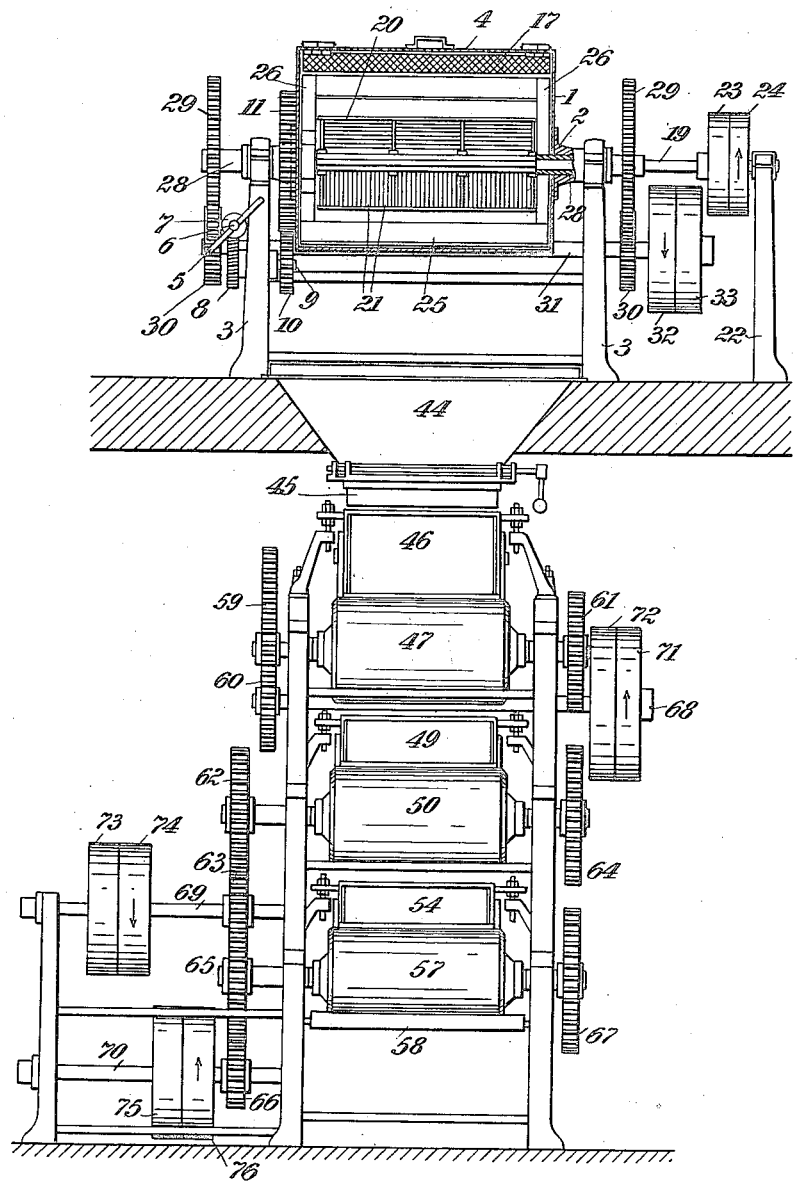
Figure 2:
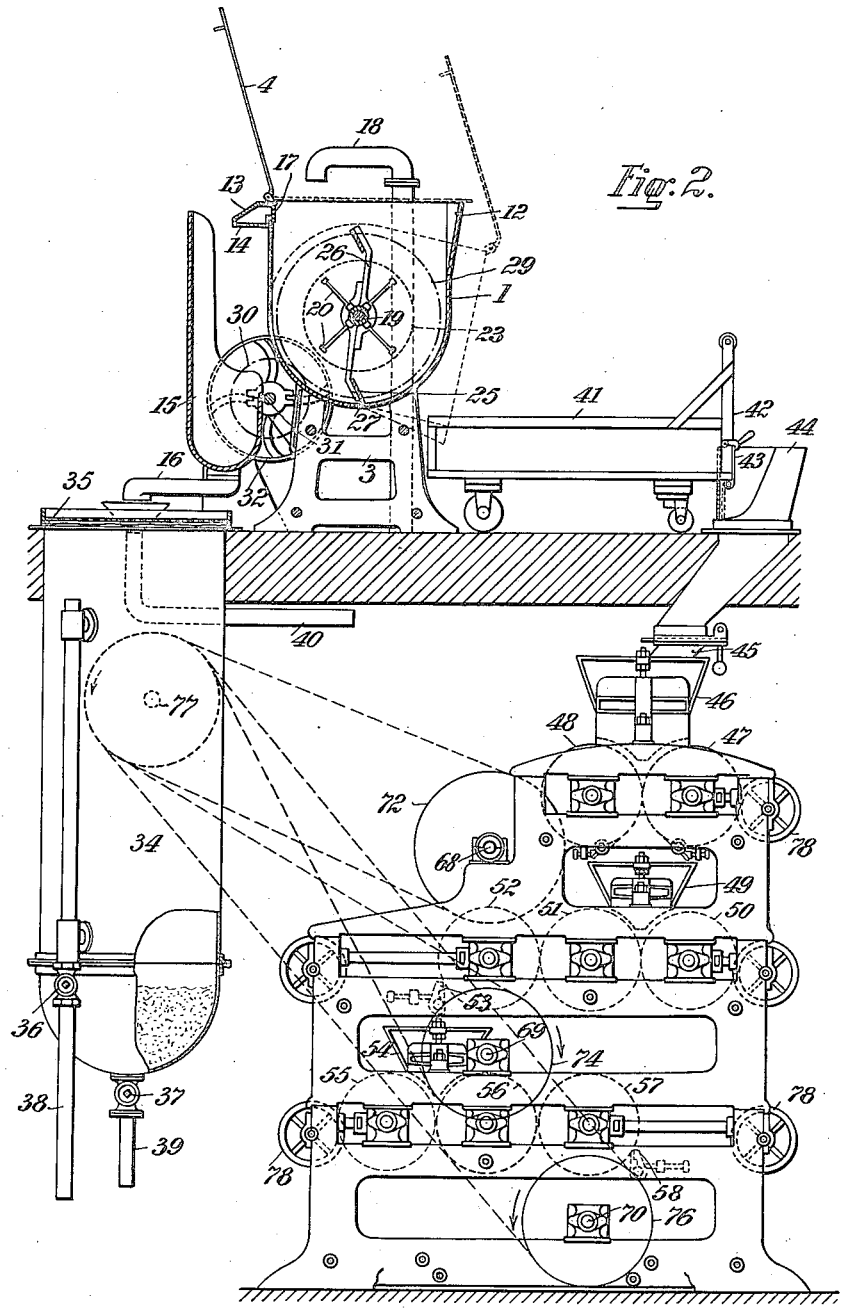

Figure 1 is an elevation of the apparatus, partly in section through the tilting vessel, Fig. 2 is a lateral view of Fig. 1, showing a cross section of the tilting vessel, Fig. 3 is a plan view of Fig. 1.

The apparatus for washing, soaking and removing the bran from the grain has a trough-shaped vessel 1 with a semi-cylindrical bottom. This trough is carried in bearings of uprights 3 by means of short shafts 2 so as to enable it to be tilted to either side. Pivoted to it is a cover 4. A handle 5 on a shaft 6 serves for tilting the trough 1. Fixed on shaft 6 is a worm 7 meshing with a gear wheel 8 on the shaft 9 of which there is another gear wheel 10 meshing with a toothed segment 11 fixed to the wall of trough 1. On one side of the trough a spout 12 is provided, while on the opposite side the wall of the trough does not extend up to the cover 4 and is provided with a channel 13 slotted at 14 the object of which is to remove the surplus liquid. Below this channel is a fixed receiver 15 which is so arranged as to receive the liquid flowing from the trough in any position of the latter. A pivoted discharge pipe 16 is connected to receiver 15. A sieve 17 is connected to cover 4 so as to cover the slot leading to channel 13. A pipe 18 supplies cold or warm water to the trough, as desired.

In the trough, a stirrer and a beater are arranged which latter can be operated independently of the stirrer. The beater has a number of vanes 20, say four, consisting in the construction illustrated of grates 21 the bars of which are alternately placed at right angles to each other in the several vanes so that the free spaces of the bars are in staggered relation. The length of the vanes is about one half of the width of trough 1. The shaft 19 of the beater is carried in a bearing of an upright 22, and motion is imparted to it by fast and loose pulleys, 23 and 24.

The stirrer is a frame-like structure inclosing the beater and extending nearly as far as the front walls of trough 1. In the construction illustrated, the stirrer has only two vanes 25 the length of which is nearly equal to the radius of the trough. The longitudinal as well as the lateral edges of vanes 25 may be provided with strips 27 sliding on the walls of the trough. Fixed on the lateral parts 26 are short hollow shafts 28 which are adapted to revolve on shaft 19. In order to prevent jamming, the stirrer is impelled at both ends by means of gear wheels 29 on the hollow shafts 28. These mesh with gear wheels 30 on a shaft 31 provided with a fast and loose pulley 32 and 33.

A settling tank 34 is arranged below pipe 16 having a sieve 35 at its top. At the bottom of tank 34 and above it are arranged discharge pipes 38 and 39 having valves 36 and 37, respectively. Outside the tank is a pipe 40 into which pipe 16 may discharge.

At the other side of trough 1 a cart or the like 41 is arranged, one front wall 42 of which is provided with a flap 43.

The cart 41 may be placed over a hopper 44 the discharge pipe 45 of which is arranged over the hopper 46 of a disintegrator. This disintegrator is constructed as a roller mill having three superimposed groups of rollers. The first group comprises two rollers 47 and 48 which revolve at different velocities. From these, the grain is dropped into the hopper 49 of the next group of rollers which has three rollers also revolving at different velocities. The grain on arriving between the first pair of rollers 50, 51 is by roller 51, on which it forms a layer, transmitted to roller 52 from which it is scraped by a stripper 53 and falls into a hopper 54 below. From this hopper, it gets to the roller pair 55, 56 of the last group, the central roller 56 of which transports it to the last roller 57 from which it is removed by a stripper 58. The groups of rollers are actuated by means of gear wheels 59, 60, 61 and 62, 63, 64 and 65, 66, 67, respectively, and by means of fast and loose pulleys 71, 72 and 73, 74 and 75, 76 on shafts 68, 69 and 70, respectively. The rollers may be adjusted by means of hand wheels 78.

The process carried out in this apparatus is as follows:—The grain from which any impurities have been removed by well known methods is filled into trough 1 where it is washed under the action of the stirrer and beater. The vanes 25 of the stirrer make about seventy revolutions, and the vanes 20 of the beater about 120 revolutions per minute. In this manner, the grains are thoroughly soaked so that any adhering particles of dirt, etc., are separated. After some minutes, the beater vanes 20 are stopped, cover 4 is opened and rinsing water is poured into the trough, the stirrer vanes 25 continuing to revolve. The separated particles of dirt are floated into channel 13 from which they finally get into pipe 40. The vanes 25, on the upper half of their revolution, move toward the channel 13 thus assisting the flow of dirty water into channel 13, the sieve 17 retaining grains that may have been carried with it. When the grain is thoroughly washed, vanes 25 are stopped and the water is removed as completely as possible by tilting trough 1 by means of crank 5. Now, trough 1 serves for softening and removing the bran from the grain. A somewhat greater quantity of water than the grains are able to absorb is supplied to trough 1 by pipe 18, this water having a temperature of 60 to 65 centigrade. Cover 4 is closed, and the stirrer and beater are again revolved. The fast revolving beater vanes 20 act like whips on the somewhat swelled grains that get into their way. This causes by degrees the bran to separate from the grains, forming an oozy mass on the surface of the water and on the trough walls. The vanes 25 wipe the walls of the trough, so that all the grains, particularly those sticking to the walls get into the path of beater vanes 20. This period of removing the bran, the duration of which is determined by the nature of the grain and may be, say, an hour and a half, being completed, the vanes 20 and 25 are stopped, cover 4 is opened and sieve 17 removed from the opening of channel 13. Then, rinsing water is admitted which drives the bran and those parts of the grains which may have become disintegrated into channel 13. The vanes 25 may assist this action as previously described. Pipe 16 is turned so that its opening is above sieve 35, and so the bran, etc., get on to that sieve, while the water collects in tank 34. Then trough 1 is tilted so that the remaining water also gets into tank 34. The starch contained in the water deposits on the bottom of tank 34. The water which is above this deposit is removed through pipe 38 while the starch is withdrawn through pipe 39 for further use. Trough 1 is then tilted to the other side into the position shown in dotted lines so that the grain falls into cart 41 and is taken to hopper 44. After the flap 43 of the cart has been opened, the moist grain falls through 45 into hopper 46 of the roller mill and between rollers 47, 48, where, owing to the different velocities of such rollers it is not only mashed but also flaked. This so prepares the grain for the following group of rollers that it adheres as a layer on roller 51 and is by it transmitted to the third roller 52. From this roller, it is scraped off by stripper 53, supplied to hopper 54 and so on through rollers 55, 56 and 57 until stripper 58 removes it from the last roller 57, whereupon it leaves the machine as a fine pulp.

The grain so prepared may be immediately worked into a homogeneous dough which is kneaded and leavened as usually. After a short time, say a half to three-quarters of an hour, the dough is ready for baking. For example, it is possible to proceed as follows: 100 kilos of rye are thoroughly washed and about 75 liters of warm water are added, so that the temperature of the mixture is 60 to 65 centigrade. Obviously, the water may be not so hot in which case its temperature is increased as desired by heating trough 1. In order to decrease the power required for removing the bran by reducing the resistance, which the somewhat swelled grain opposes to the operation of the beater, a somewhat greater quantity of water is added than the grain is able to absorb. An excess of water may be added again later when preparing the dough.

This process gives a very good yield of the grain and produces an exceedingly nutritious bread. This is of the utmost importance from an economical point of view. The dough from 100 kilos of rye weighs about 175 kilos. Assuming a loss in baking of about 12%, 154 kilos of bread will be obtained. The digestibility of the albumin in such bread is, on an average, equal to that of albumin in bread of rye flour of usual fineness.

By retaining almost completely those parts of the grain which are richest in albumin, the bread prepared by this process is richer in albumin than other rye bread. In the dry substance of the bread, 14.2% of albumin were found while in ordinary rye bread the content of albumin is only 10.7%.

A particular advantage of the process is the fact that the treatment of the grain as compared with other methods is very simple, rapid and cleanly.

The temperature of the water added may vary within certain limits. Preferably, the temperature should not exceed 65 centigrade, as at higher temperatures undesirable changes occur in vegetable albumin. At a temperature considerably below 60 centigrade, the process becomes slow and incomplete so that the product in some cases may not possess the desired qualities.

In the manufacture of whole grain bread, temperatures of 50 to 65 centigrade have been employed already, but the grain was not freed from bran. A good yield was impossible here owing to the presence of the bran in the bread. It has also been attempted to obtain bread directly from grain which had been freed from bran, but the bran was not removed at so high a temperature so that what was achieved by removing the bran, was again undone by unsuitable further treatment.

What I claim is:

1. The process of making food products from grain in the presence of water at a temperature of about 60° centigrade to separate bran from the grain, disintegrating the decorticated grain, and working the product into dough for baking.

2. The process of making food products from grain consisting in beating the grain in the presence of water at a temperature of about 60° centigrade, removing the separated bran and suspended particles of starch by flotation from the decorticated grain kernels, disintegrating the latter in their moist condition, and working the product into dough for baking.

In testimony, that I claim the foregoing as my invention, I have signed my name in presence of two subscribing witnesses.

PAUL GROSS.

Witnesses:
HENRY HASPER,
CHAS. PETERS.